United States Patent
Oyama et al.

(10) Patent No.: US 10,818,923 B2
(45) Date of Patent: Oct. 27, 2020

(54) CATHODE MATERIAL FOR LITHIUM-ION SECONDARY BATTERY, CATHODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Masataka Oyama, Tokyo (JP); Takao Kitagawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/433,832

(22) Filed: Feb. 15, 2017

(65) Prior Publication Data
US 2018/0097231 A1   Apr. 5, 2018

(30) Foreign Application Priority Data
Sep. 30, 2016   (JP) .................. 2016-192877

(51) Int. Cl.
| | |
|---|---|
| *H01M 4/58* | (2010.01) |
| *H01M 4/36* | (2006.01) |
| *H01M 4/02* | (2006.01) |
| *H01M 4/136* | (2010.01) |
| *H01M 4/62* | (2006.01) |
| H01M 10/0525 | (2010.01) |

(52) U.S. Cl.
CPC .......... *H01M 4/5825* (2013.01); *H01M 4/02* (2013.01); *H01M 4/136* (2013.01); *H01M 4/366* (2013.01); *H01M 4/625* (2013.01); H01M 10/0525 (2013.01); H01M 2004/028 (2013.01)

(58) Field of Classification Search
CPC ..... H01M 4/5825; H01M 4/366; H01M 4/625
See application file for complete search history.

(56) References Cited

U.S. PATENT DOCUMENTS

2012/0189914 A1   7/2012   Hara et al.

FOREIGN PATENT DOCUMENTS

| EP | 2485301 A1 | 8/2012 |
|---|---|---|
| JP | 2009-004371 A | 1/2009 |
| JP | 2011-049161 A | 3/2011 |
| JP | 2012-104290 A | 5/2012 |
| JP | 2013-258036 A | 12/2013 |
| JP | 2014-116322 A | 6/2014 |

OTHER PUBLICATIONS

Aveka Grinding and Classification, Jun. 2019, pp. 1-2 (Year: 2019).*
Search Report for European Patent Application No. 17156161.6 (dated Jul. 7, 2017).
Notice of Allowance for Japanese Patent Application No. 2016-192877 (dated Aug. 15, 2017).

* cited by examiner

*Primary Examiner* — Victoria H Lynch
(74) *Attorney, Agent, or Firm* — Merchant & Gould P.C.

(57) ABSTRACT

A cathode material for a lithium-ion secondary battery of the present invention is active material particles including central particles represented by $Li_xA_yM_zPO_4$ and a carbonaceous film that coats surfaces of the central particles, in which a median diameter is 0.50 μm or more and 0.80 μm or less, and a chromaticity b* in an L*a*b* color space is 1.9 or more and 2.3 or less.

13 Claims, No Drawings

CATHODE MATERIAL FOR LITHIUM-ION SECONDARY BATTERY, CATHODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2016-192877 filed Sep. 30, 2016, the disclosure of which is herein incorporated by reference in its entirety.

BACKGROUND OF THE INVENTION

Field of the Invention

The present invention relates to a cathode material for a lithium-ion secondary battery, a cathode for a lithium-ion secondary battery, and a lithium-ion secondary battery.

Description of Related Art

In recent years, as batteries anticipated to have a small size and a high capacity and weigh less, non-aqueous electrolytic solution-based secondary batteries such as lithium-ion secondary batteries have been proposed and put into practical use. Lithium-ion secondary batteries are constituted of a cathode and an anode which have properties capable of reversibly intercalating and deintercalating lithium ions, and a non-aqueous electrolyte.

As anode active materials for anode materials of lithium-ion secondary batteries, generally, carbon-based materials or Li-containing metal oxides having properties capable of reversibly intercalating and deintercalating lithium ions are used. Examples of the Li-containing metal oxides include lithium titanate ($Li_4Ti_5O_{12}$).

Meanwhile, as cathodes of lithium-ion secondary batteries, cathode material mixtures including a cathode material, a binder, and the like are used. As the cathode active material, for example, Li-containing metal oxides having properties capable of reversibly intercalating and deintercalating lithium ions such as lithium iron phosphate ($LiFePO_4$) are used. In addition, cathodes of lithium-ion secondary batteries are formed by applying the cathode material mixture onto the surface of a metal foil that is called an electrode current collector.

As electrolytic solutions for lithium-ion secondary batteries, non-aqueous solvents are used. Non-aqueous solvents enable the application of cathode active materials that are oxidized and reduced at a high potential or anode active materials that are oxidized and reduced at a low potential. Therefore, lithium-ion secondary batteries having a higher voltage can be realized.

These lithium-ion secondary batteries have a small size and a higher energy and weigh less than secondary batteries in the related art such as lead batteries, nickel cadmium batteries, and nickel metal hydride batteries. Therefore, lithium-ion secondary batteries are used not only as small-size power supplies used in portable electronic devices such as mobile phones and notebook personal computers but also as large-size stationary emergency power supplies.

In recent years, there has been a demand for the performance improvement of lithium-ion secondary batteries, and a variety of studies have been carried out. For example, in a case in which a lithium-ion secondary battery is used in a high-current density region, there is a demand for additional improvement in electron conductivity in order to improve the performance. Regarding the above-described property demands, techniques for coating the surfaces of cathode active materials with a carbonaceous material (hereinafter, in some cases, referred to as "carbonaceous film") are known (for example, refer to Japanese Laid-open Patent Publication No. 2009-004371, Japanese Laid-open Patent Publication No. 2011-049161, and Japanese Laid-open Patent Publication No. 2012-104290). As a method for coating the surface of a cathode active material with a carbonaceous film, methods in which a cathode active material and a carbon source are mixed together and this mixture is calcinated in an inert atmosphere or a reducing atmosphere are known.

SUMMARY OF THE INVENTION

When the cathode density is improved by filling the carbonaceous film that coats the surface of the cathode active material with a larger amount of a cathode active material, the energy density per unit volume improves. However, in a case in which the cathode active material agglomerates and thus forms an agglomerate, voids are generated among the cathode active material grains in the carbonaceous film, and thus there is a problem in that the cathode density decreases. Therefore, techniques in which the agglomerate made of the cathode active material is cracked in a gas phase or the like so as to decrease the agglomerate diameter, and voids among the cathode active material grains are efficiently filled with the cathode active material, thereby improving the energy density per unit volume is known.

However, in a case in which a cathode material including the primary particles of a cathode active material such as lithium iron phosphate and a carbonaceous film that coats the surfaces of the primary particles is cracked, when the cracking intensity is too high, the carbonaceous film is peeled off from the surfaces of the primary particles, and thus the electron conductivity decreases. A decrease in the electron conductivity causes the deterioration of input and output characteristics or a decrease in the capacity after a charge and discharge cycle, which is not preferable. In addition, when the cracking intensity is too low, the cathode density decrease, which is not preferable.

For the above-described reasons, it is most preferable to crack the cathode material to necessary agglomerate grain sizes while guaranteeing electron conductivity so as to prevent the carbonaceous film from being peeled off. However, the cracking intensity at which the carbonaceous film begins to be peeled off varies depending on the primary particle diameter of the cathode active material, the amount of carbon included in the cathode material, or the like, and thus it is difficult to optimally control the cracking intensity.

The present invention has been made in consideration of the above-described circumstances, and an object of the present invention is to provide a cathode material for a lithium-ion secondary battery which suppresses the peeling of a carbonaceous film that coats the surfaces of primary particles of a cathode active material and is capable of improving the cathode density while guaranteeing the electron conductivity, a cathode for a lithium-ion secondary battery including the cathode material for a lithium-ion secondary battery, and a lithium-ion secondary battery including the cathode for a lithium-ion secondary battery.

The present inventors and the like carried out intensive studies in order to achieve the above-described object, consequently found that, when, in active material particles including central particles represented by $Li_xA_yM_zPO_4$ (0.95≤x≤1.1, 0.8≤y≤1.1, and 0≤z≤0.2; here, A represents at least one element selected from the group consisting of Fe, Mn, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles, the median diameter is 0.50 μm or more and 0.80 μm or less, and the chromaticity b* in the L*a*b* color space is 1.9 or more and 2.3 or less, it is possible to provide a cathode material for a lithium-ion secondary battery which suppresses the peeling of the carbonaceous film that coats the surfaces of the primary particles of a cathode active material and is capable of improving the cathode density while guaranteeing the electron conductivity, and completed the present invention.

A cathode material for a lithium-ion secondary battery of the present invention is active material particles including central particles represented by $Li_xA_yM_zPO_4$ (0.95≤x≤1.1, 0.8≤y≤1.1, and 0≤z≤0.2; here, A represents at least one element selected from the group consisting of Fe, Mn, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles, in which a median diameter is 0.50 μm or more and 0.80 μm or less, and a chromaticity b* in an L*a*b* color space is 1.9 or more and 2.3 or less.

A cathode for a lithium-ion secondary battery of the present invention is a cathode material for a lithium-ion secondary battery including an electrode current collector and a cathode mixture layer formed on the electrode current collector, in which the cathode mixture layer includes the cathode material for a lithium-ion secondary battery of the present invention.

A lithium-ion secondary battery of the present invention includes the cathode for a lithium-ion secondary battery of the present invention.

According to the cathode material for a lithium-ion secondary battery of the present invention, since the median diameter is 0.50 μm or more and 0.80 μm or less, and the chromaticity b* in the L*a*b* color space is 1.9 or more and 2.3 or less, it is possible to provide a cathode material for a lithium-ion secondary battery which suppresses the peeling of the carbonaceous film that coats the surfaces of the primary particles of a cathode active material and is capable of improving the cathode density while guaranteeing the electron conductivity.

According to the cathode for a lithium-ion secondary battery of the present invention, since the cathode material for a lithium-ion secondary battery of the present invention is included, a lithium-ion secondary battery having a high energy density and excellent input and output characteristics can be obtained.

According to the lithium-ion secondary battery of the present invention, since the cathode for a lithium-ion secondary battery of the present invention is included, a lithium-ion secondary battery having a high energy density and excellent input and output characteristics can be obtained.

DETAILED DESCRIPTION OF THE INVENTION

Embodiments of a cathode material for a lithium-ion secondary battery, a cathode for a lithium-ion secondary battery, and a lithium-ion secondary battery of the present invention will be described.

Meanwhile, the present embodiment is specific description for better understanding of the gist of the invention and does not limit the present invention unless particularly otherwise described.

Cathode Material for Lithium-Ion Secondary Battery

A cathode material for a lithium-ion secondary battery of the present embodiment (hereinafter, in some cases, simply referred to as "cathode material") is active material particles including central particles represented by $Li_xA_yM_zPO_4$ (0.95≤x≤1.1, 0.8≤y≤1.1, and 0≤z≤0.2; here, A represents at least one element selected from the group consisting of Fe, Mn, and Ni, and M represents at least one element selected from the group consisting of Mg, Ca, Co, Sr, Ba, Ti, Zn, B, Al, Ga, In, Si, Ge, and rare earth elements) and a carbonaceous film that coats surfaces of the central particles, in which the median diameter is 0.50 μm or more and 0.80 μm or less, and the chromaticity b* in the L*a*b* color space is 1.9 or more and 2.3 or less.

The average primary particle diameter of the cathode material for a lithium-ion secondary battery (active material particles) of the present embodiment is preferably 10 nm or more and 700 nm or less and more preferably 20 nm or more and 500 nm or less.

When the average primary particle diameter of the cathode material is 10 nm or more, the specific surface area of the cathode material increases, and thus an increase in the mass of necessary carbon is suppressed, and it is possible to suppress a decrease in the charge and discharge capacity of lithium-ion secondary batteries. On the other hand, when the average primary particle diameter of the cathode material is 700 nm or less, it is possible to suppress the extension of the time taken for lithium ions or electrons to migrate in the cathode material. Therefore, it is possible to suppress the deterioration of the output characteristics attributed to an increase in the internal resistance of lithium-ion secondary batteries.

Here, the average particle diameter refers to the volume-average particle diameter. The average primary particle diameter of the primary particles of the cathode material can be measured using a laser diffraction and scattering particle size distribution measurement instrument or the like. In addition, it is also possible to arbitrarily select a plurality of primary particles observed using a scanning electron microscope (SEM) and compute the average particle diameter of the primary particles.

The amount of carbon included in the cathode material for a lithium-ion secondary battery, that is, the amount of carbon that forms the carbonaceous film is preferably 0.1 parts by mass or more and 10 parts by mass or less and more preferably 0.6 parts by mass or more and 3 parts by mass or less with respect to 100 parts by mass of the central particles.

When the amount of carbon is 0.1 parts by mass or more, the discharge capacity of lithium-ion secondary batteries at a high charge-discharge rate increases, and it is possible to realize sufficient charge and discharge rate performance. On the other hand, when the amount of carbon is 10 parts by mass or less, it is possible to suppress the battery capacity of lithium-ion secondary batteries per unit mass of the cathode material being decreased more than necessary.

The carbon supporting amount with respect to the specific surface area of the primary particles of the central particles constituting the cathode material for a lithium-ion secondary battery ("[the carbon supporting amount]/[the specific surface area of the primary particles of the central particles]"; hereinafter, referred to as "the carbon supporting amount ratio") is preferably 0.01 g/m² or more and 0.5 g/m² or less and more preferably 0.03 g/m² or more and 0.3 g/m² or less.

When the carbon supporting amount ratio is 0.01 g/m² or more, the discharge capacity of lithium-ion secondary batteries at a high charge-discharge rate increases, and it is possible to realize sufficient charge and discharge rate performance. On the other hand, when the carbon supporting amount ratio is 0.5 g/m² or less, it is possible to suppress the battery capacity of lithium-ion secondary batteries per unit mass of the cathode material being decreased more than necessary.

The BET specific surface area of the cathode material for a lithium-ion secondary battery is preferably 5 m²/g or more and 25 m²/g or less.

When the BET specific surface area is 5 m²/g or more, the coarsening of the cathode material is suppressed, and thus it is possible to increase the diffusion rate of lithium ions among the particles. Therefore, it is possible to improve the battery characteristics of lithium-ion secondary batteries. On the other hand, when the BET specific surface area is 25 m²/g or less, it is possible to increase the cathode density in cathodes including the cathode material for a lithium-ion secondary battery of the present embodiment, and thus it is possible to provide lithium-ion secondary batteries having a high energy density.

The median diameter of the cathode material for a lithium-ion secondary battery is 0.50 μm or more and 0.80 μm or less and preferably 0.55 μm or more and 0.75 μm or less.

When the median diameter is 0.50 μm or more, it is possible to prevent electron conductivity from being decreased due to excessive cracking. On the other hand, when the median diameter is 0.80 μm or less, it becomes possible to densely fill cathodes with the cathode active material during the production of the cathodes including the cathode material for a lithium-ion secondary battery, and the energy density per unit volume improves.

The chromaticity b* in the L*a*b* color space of the cathode material for a lithium-ion secondary battery is 1.9 or more and 2.3 or less and preferably 1.95 or more and 2.3 or less.

The chromaticity b* of the cathode material for a lithium-ion secondary battery is an index indicating the degree of coating of the carbonaceous film with the central particles.

When the chromaticity b* is 1.9 or more, it becomes possible to densely fill cathodes with the cathode active material during the production of the cathodes including the cathode material for a lithium-ion secondary battery, and the energy density per unit volume improves. On the other hand, when the chromaticity b* is 2.3 or less, in the cathode material for a lithium-ion secondary battery, it is possible to set the degree of exposure of central particles that are not coated with the carbonaceous film in a range sufficient enough to increase the energy density per unit volume, and it is possible to prevent electron conductivity from being decreased due to excessive cracking.

Central Particles

The central particles constituting the cathode material for a lithium-ion secondary battery of the present embodiment are made of a cathode active material represented by $Li_xA_yM_zPO_4$ ($0.95 \leq x \leq 1.1$, $0.8 \leq y \leq 1.1$, and $0 \leq z \leq 0.2$; here, A represents at least one element selected from the group consisting of Fe, Mn, and Ni, and M represents at least one element selected from the group consisting of Mg, Ca, Co, Sr, Ba, Ti, Zn, B, Al, Ga, In, Si, Ge, and rare earth elements).

Meanwhile, the rare earth elements refer to 15 elements of La, Ce, Pr, Nd, Pm, Sm, Eu, Gd, Tb, Dy, Ho, Er, Tm, Yb, and Lu which belong to the lanthanum series.

The average primary particle diameter of the primary particles of the central particles constituting the cathode material particles for a lithium-ion secondary battery of the present embodiment is preferably 5 nm or more and 800 nm or less and more preferably 20 nm or more and 500 nm or less.

When the average primary particle diameter of the primary particles of the central particles is 5 nm or more, it is possible to sufficiently coat the surfaces of the primary particles of the central particles with the carbonaceous film. In addition, it is possible to increase the discharge capacity of lithium-ion secondary batteries during high-speed charge and discharge and realize sufficient charge and discharge performance. On the other hand, when the average primary particle diameter of the primary particles of the central particles is 800 nm or less, it is possible to decrease the internal resistance of the primary particles of the central particles. In addition, it is possible to increase the discharge capacity of lithium-ion secondary batteries during high-speed charge and discharge.

The shape of the primary particles of the central particles constituting the cathode material for a lithium-ion secondary battery of the present embodiment is not particularly limited, but the shape of the primary particles of the central particles is preferably a spherical shape since it is easy to generate the cathode active material made of a spherical, particularly, truly spherical agglomerate.

When the shape of the primary particles of the central particles is a spherical shape, it is possible to decrease the amount of a solvent when cathode material paste is prepared by mixing the cathode material for a lithium-ion secondary battery, a binder resin (binding agent), and a solvent. Furthermore, when the shape of the primary particles of the central particles is a spherical shape, it becomes easy to apply the cathode material paste to electrode current collectors. Furthermore, when the shape of the primary particles of the central particles is a spherical shape, the surface area of the primary particles of the central particles is minimized, and thus it is possible to minimize the amount of the binder resin (binding agent) blended into the cathode material paste. As a result, it is possible to decrease the internal resistance of cathodes for which the cathode material for a lithium-ion secondary battery of the present embodiment is used. In addition, when the shape of the primary particles of the central particles is a spherical shape, it becomes easy to closely pack the cathode material, and thus the amount of the cathode material for a lithium-ion secondary battery packed per unit volume of the cathode increases. As a result, it is possible to increase the cathode density, and high-capacity lithium-ion secondary batteries can be obtained.

Carbonaceous Film

The carbonaceous film coats the surfaces of the central particles.

When the surfaces of the central particles are coated with the carbonaceous film, it is possible to improve the electron conductivity of the cathode material for a lithium-ion secondary battery.

The thickness of the carbonaceous film is preferably 0.2 nm or more and 10 nm or less and more preferably 0.5 nm or more and 4 nm or less.

When the thickness of the carbonaceous film is 0.2 nm or more, it is possible to prevent the excessively thin thickness of the carbonaceous film from disabling the formation of films having a desired resistance value. In addition, it is possible to ensure conductive properties suitable for the cathode material for a lithium-ion secondary battery. On the other hand, when the thickness of the carbonaceous film is 10 nm or less, it is possible to suppress a decrease in the battery capacity per unit mass of the cathode material for a lithium-ion secondary battery.

In addition, when the thickness of the carbonaceous film is 0.2 nm or more and 10 nm or less, it becomes easy to closely pack the cathode material for a lithium-ion secondary battery, and thus the amount of the cathode material for a lithium-ion secondary battery packed per unit volume of the cathode increases. As a result, it is possible to increase the cathode density, and high-capacity lithium-ion secondary batteries can be obtained.

The coating ratio of the carbonaceous film with respect to the central particles is preferably 60% or more and 95% or less and more preferably 80% or more and 95% or less. When the coating ratio of the carbonaceous film is 60% or more, the coating effect of the carbonaceous film can be sufficiently obtained.

According to the cathode material for a lithium-ion secondary battery of the present embodiment, in active material particles including central particles represented by $Li_xA_yM_zPO_4$ ($0.95 \le x \le 1.1$, $0.8 \le y \le 1.1$, and $0 \le z \le 0.2$; here, A represents at least one element selected from the group consisting of Fe, Mn, and Ni, and M represents at least one element selected from the group consisting of Mg, Ca, Co, Sr, Ba, Ti, Zn, B, Al, Ga, In, Si, Ge, and rare earth elements) and a carbonaceous film that coats the surfaces of the central particles, when the median diameter is 0.50 μm or more and 0.80 μm or less, and the chromaticity b* in the L*a*b* color space is 1.9 or more and 2.3 or less, it is possible to provide a cathode material for a lithium-ion secondary battery which suppresses the peeling of the carbonaceous film that coats the surfaces of the primary particles of a cathode active material and is capable of improving the cathode density while guaranteeing the electron conductivity.

Method for Manufacturing Cathode Material for Lithium-Ion Secondary Battery

The cathode material for a lithium-ion secondary battery of the present embodiment can be manufactured by cracking active material particles made of an agglomerate.

Method for Manufacturing Active Material Particles

A method for manufacturing active material particles in the present embodiment includes, for example, a manufacturing step of the central particles and a precursor of the central particles, a slurry preparation step of preparing a slurry by mixing at least one central particle raw material selected from the group consisting of the central particles and the precursor of the central particles, an organic compound which is a carbonaceous film precursor, and water, and a calcination step of drying the slurry and calcinating the obtained dried substance in a non-oxidative atmosphere.

Step of Manufacturing Central Particles and Precursor of Central Particles

As a method for manufacturing a compound (the central particles) represented by $Li_xA_yM_zPO_4$ ($0.95 \le x \le 1.1$, $0.8 \le y \le 1.1$, and $0 \le z \le 0.2$; here, A represents at least one element selected from the group consisting of Fe, Mn, and Ni, and M represents at least one element selected from the group consisting of Mg, Ca, Co, Sr, Ba, Ti, Zn, B, Al, Ga, In, Si, Ge, and rare earth elements), a method of the related art such as a solid phase method, a liquid phase method, and a gas phase method is used. Examples of $Li_xA_yM_zPO_4$ obtained using the above-described method include particulate substances (hereinafter, in some cases, referred to as "$Li_xA_yM_zPO_4$ particles").

The $Li_xA_yM_zPO_4$ particles is obtained by, for example, hydrothermally synthesizing a slurry-form mixture obtained by mixing a Li source, an A source, a P source, water, and, as necessary, an M source. By means of hydrothermal synthesis, $Li_xA_yM_zPO_4$ is generated as a precipitate in water. The obtained precipitate may be a precursor of $Li_xA_yM_zPO_4$. In this case, target $Li_xA_yM_zPO_4$ particles are obtained by calcinating the precursor of $Li_xA_yM_zPO_4$.

In this hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like. Among these, as the Li source, at least one selected from the group consisting of lithium acetate, lithium chloride, and lithium hydroxide is preferably used.

Examples of the A source include chlorides, carboxylates, sulfates, and the like which include at least one element selected from the group consisting of Fe, Mn, and Ni. For example, in a case in which A in $Li_xA_yM_zPO_4$ is Fe, examples of the Fe source include divalent iron salts such as iron (II) chloride ($FeCl_2$) iron (II) acetate ($Fe(CH_3COO)_2$), and iron (II) sulfate ($FeSO_4$) Among these, as the Fe source, at least one selected from the group consisting of iron (II) chloride, iron (II) acetate, and iron (II) sulfate is preferably used.

Examples of the M source include chlorides, carboxylates, sulfates, and the like which include at least one element selected from the group consisting of Mg, Ca, Co, Sr, Ba, Ti, Zn, B, Al, Ga, In, Si, Ge, and rare earth elements.

Examples of the P source include phosphoric acid compounds such as phosphoric acid ($H_3PO_4$), ammonium dihydrogen phosphate ($NH_4H_2PO_4$), diammonium hydrogen phosphate (($NH_4)_2HPO_4$), and the like. Among these, as the P source, at least one selected from the group consisting of phosphoric acid, ammonium dihydrogen phosphate, and diammonium hydrogen phosphate is preferably used.

Slurry Preparation Step

By means of the slurry preparation step, the organic compound which is the precursor of the carbonaceous film is interposed among the central particles, and the organic compound and the central particles are uniformly mixed together, and thus it is possible to uniformly coat the surfaces of the central particles with the organic compound.

Furthermore, by means of the calcination step, the organic compound that coats the surfaces of the central particles is carbonized, thereby obtaining active material particles (cathode material) including the central particles uniformly coated with the carbonaceous film.

The organic compound that is used in the method for manufacturing active material particles in the present embodiment is not particularly limited as long as the compound is capable of forming the carbonaceous film on the surfaces of the central particles. Examples of the above-described organic compound include divalent alcohols such as polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, and ethylene glycol, trivalent alcohols such as glycerin, and the like.

In the slurry preparation step, the central particle raw material and the organic compound are dissolved or dispersed in water, thereby preparing a homogeneous slurry.

When these raw materials are dissolved or dispersed in water, it is also possible to add a dispersant thereto.

A method for dissolving or dispersing the central particle raw material and the organic compound in water is not particularly limited as long as the central particle raw material is dispersed in water, and the organic compound is dissolved or dispersed in water. The above-described method is preferably a method in which a medium stirring-type dispersion device that stirs medium particles at a high rate such as a planetary ball mill, an oscillation ball mill, a bead mill, a paint shaker, or an attritor is used.

When the central particle raw material and the organic compound are dissolved or dispersed in water, it is preferable to disperse the central particle raw material in water in a primary particle form, then, add the organic compound to water, and stir the organic compound so as to be dissolved or dispersed. In such a case, the surfaces of the primary particles of the central particle raw material are easily coated with the organic compound. Therefore, the organic compound is uniformly dispersed on the surfaces of the primary particles of the central particle raw material, and consequently, the surfaces of the primary particles of the central particles are coated with the carbonaceous film derived from the organic compound.

Calcination Step

Next, the slurry prepared in the slurry preparation step is sprayed and dried in a high-temperature atmosphere, for example, in the atmosphere of 70° C. or higher and 250° C. or lower.

Next, the obtained dried substance is calcinated in a non-oxidative atmosphere at a temperature of preferably 500° C. or higher and 1,000° C. or lower and more preferably 600° C. or higher and 1,000° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidation of the dried substance, a reducing atmosphere including approximately several percentages by volume of a reducing gas such as hydrogen ($H_2$) is preferred. In addition, for the purpose of removing organic components evaporated in the non-oxidative atmosphere during calcination, a susceptible or burnable gas such as oxygen ($O_2$) may be introduced into the non-oxidative atmosphere.

Here, when the calcination temperature is set to 500° C. or higher, it is easy for the organic compound in the dried substance to be sufficiently decomposed and reacted, and the organic compound is easily and sufficiently carbonized. As a result, it is easy to prevent the generation of a high-resistance decomposed substance of the organic compound in the obtained agglomerate. Meanwhile, when the calcination temperature is set to 1,000° C. or lower, lithium (Li) in the central particle raw material is not easily evaporated, and the grain growth of the central particles to a size that is equal to or larger than the target size is suppressed. As a result, in a case in which a lithium-ion secondary battery including a cathode including the cathode material of the present embodiment is produced, it is possible to prevent the discharge capacity at a high charge-discharge rate from decreasing, and it is possible to realize lithium-ion secondary batteries having sufficient charge and discharge rate performance.

By means of the above-described steps, active material particles made of an agglomerate in which the surfaces of the primary particles of the central particles are coated with carbon (the carbonaceous film) generated by the thermal decomposition of the organic compound in the dried substance are obtained.

Cracking step of active material particles Next, at least part of the active material particles made of this agglomerate are cracked. Here, in order to "crack at least part of the active material particles made of the agglomerate", at least part of the agglomerate needs to be cracked, and not all the agglomerate needs to be cracked.

A device that is used for the cracking of the agglomerate needs to be capable of cracking not all of the agglomerate but part of the agglomerate, and, for example, an air flow-type fine crusher such as a dry-type ball mill, a wet-type ball mill, a mixer, or a jet mill, an ultrasonic crusher, or the like is used.

In the present embodiment, a jet mill is preferably used for cracking since the damage of the active material particles (the central particles and the primary particles) is suppressed.

In addition, the supply rate of the agglomerate into the jet mill is preferably set to 50 g/hour to 1,500 g/hour, and the air pressure is preferably set to 0.3 MPa to 0.7 MPa. The cracking intensity can be freely adjusted by varying the supply rate of the agglomerate being injected into the jet mill. In addition, the median diameter and the chromaticity $b^*$ of the cathode material for a lithium-ion secondary battery can be adjusted by adjusting the cracking intensity. Here, in a case in which the cracking intensity is weak, the median diameter is large, and the chromaticity $b^*$ becomes a low value. On the other hand, in a case in which the cracking intensity is strong, the median diameter is small, and the chromaticity $b^*$ becomes a high value. When the chromaticity $b^*$ is a high value, the degree of exposure of the central particles that are not coated with the carbonaceous film increases in the cathode material for a lithium-ion secondary battery.

Cathode for Lithium-Ion Secondary Battery

A cathode for a lithium-ion secondary battery of the present embodiment (hereinafter, in some cases, referred to as "cathode") includes the cathode material for a lithium-ion secondary battery of the present embodiment. In more detail, the cathode of the present embodiment includes an electrode current collector made of a metal foil and a cathode mixture layer formed on the electrode current collector, and the cathode mixture layer includes the cathode material for a lithium-ion secondary battery of the present embodiment. That is, the cathode of the present embodiment is obtained by forming a cathode mixture layer on one main surface of the electrode current collector using the cathode material for a lithium-ion secondary battery of the present embodiment.

The cathode of the present embodiment is mainly used as a cathode for a lithium-ion secondary battery.

Since the cathode for a lithium-ion secondary battery of the present embodiment includes the cathode material for a lithium-ion secondary battery of the present embodiment, lithium-ion secondary batteries for which the cathode for a lithium-ion secondary battery of the present embodiment is used have a high energy density and have excellent input and output characteristics.

Method for Manufacturing Cathode for Lithium-Ion Secondary Battery

The method for manufacturing the cathode for a lithium-ion secondary battery of the present embodiment is not particularly limited as long as a cathode mixture layer can be formed on one main surface of a current collector using the cathode material for a lithium-ion secondary battery of the present embodiment. Examples of the method for manufacturing the cathode of the present embodiment include the following method.

First, the cathode material for a lithium-ion secondary battery of the present embodiment, a binding agent made of a binder resin, and a solvent are mixed together, thereby preparing cathode material paste. At this time, to the cathode material paste in the present embodiment, a conductive auxiliary agent such as carbon black may be added thereto if necessary.

Binding Agent

As the binding agent, that is, the binder resin, for example, a polytetrafluoroethylene (PTFE) resin, a polyvinylidene fluoride (PVdF) resin, fluorine rubber, or the like is preferably used.

The blending amount of the binding agent used to prepare the cathode material paste is not particularly limited and is, for example, preferably 1 part by mass or more and 30 parts by mass or less and more preferably 3 parts by mass or more and 20 parts by mass or less with respect to 100 parts by mass of the cathode material for a lithium-ion secondary battery.

When the blending amount of the binding agent is 1 part by mass or more, it is possible to sufficiently increase the binding property between the cathode mixture layer and the electrode current collector. Therefore, it is possible to prevent the cathode mixture layer from being cracked or dropped during a molding of the cathode mixture layer by means of rolling or the like. In addition, it is possible to prevent the cathode mixture layer from being peeled off from the electrode current collector in a process of charging and discharging lithium-ion secondary batteries and prevent the battery capacity or the charge-discharge rate from being decreased. On the other hand, when the amount of the binding agent blended is 30 parts by mass or less, it is possible to prevent the internal resistance of the cathode material for a lithium-ion secondary battery from being decreased and prevent the battery capacity at a high charge-discharge rate from being decreased.

Conductive Auxiliary Agent

The conductive auxiliary agent is not particularly limited, and, for example, at least one element selected from the group consisting of fibrous carbon such as acetylene black (AB), KETJEN BLACK, furnace black, vapor-grown carbon fiber (VGCF), and carbon nanotube is used.

Solvent

The solvent that is used in the cathode material paste including the cathode material for a lithium-ion secondary battery of the present embodiment is appropriately selected depending on the properties of the binding agent. When the solvent is appropriately selected, it is possible to facilitate the cathode material paste to be applied to substances to be coated such as electrode current collectors.

Examples of the solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycolmonoethylether (ethyl cellosolve), ethylene glycol monobutyl ether (butyl cellosolve), diethylene glycol monomethyl ether, and diehtylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidone (NMP), glycols such as ethylene glycol, diethylene glycol, and propylene glycol, and the like. These solvents may be used singly, or a mixture of two or more solvents may be used.

The content rate of the solvent in the cathode material paste is preferably 50% by mass or more and 70% by mass or less and more preferably 55% by mass or more and 65% by mass or less in a case in which the total mass of the cathode material for a lithium-ion secondary battery of the present embodiment, the binding agent, and the solvent is set to 100 parts by mass.

When the content rate of the solvent in the cathode material paste is in the above-described range, it is possible to obtain cathode material paste having excellent cathode formability and excellent battery characteristics.

A method for mixing the cathode material for a lithium-ion secondary battery of the present embodiment, the binding agent, the conductive auxiliary agent, and the solvent is not particularly limited as long as these components can be uniformly mixed together. Examples thereof include mixing methods in which a kneader such as a ball mill, a sand mill, a planetary (sun-and-planet) mixer, a paint shaker, or a homogenizer is used.

The cathode material paste is applied to one main surface of the electrode current collector so as to form a coated film, and then this coated film is dried, thereby obtaining the electrode current collector having a coated film made of a mixture of the cathode material and the binding agent formed on one main surface.

After that, the coated film is pressed by pressure and is dried, thereby producing a cathode having a cathode mixture layer on one main surface of the electrode current collector.

Lithium-Ion Secondary Battery

A lithium-ion secondary battery of the present embodiment includes a cathode, an anode, and a non-aqueous electrolyte, in which the cathode is the cathode for a lithium-ion secondary battery of the present embodiment. Specifically, the lithium-ion secondary battery of the present embodiment includes the cathode for a lithium-ion secondary battery of the present embodiment as a cathode, an anode, a separator, and a non-aqueous electrolyte.

In the lithium-ion secondary battery of the present embodiment, the anode, the non-aqueous electrolyte, and the separator are not particularly limited.

Anode

Examples of the anode include anodes including an anode material such as Li metal, carbon materials such as natural graphite and hard carbon, Li alloys, $Li_4Ti_5O_{12}$, $Si(Li_{4.4}Si)$, and the like.

Non-Aqueous Electrolyte

Examples of the non-aqueous electrolyte include non-aqueous electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 mol/dm$^3$.

Separator

As the separator, it is possible to use, for example, porous propylene.

In addition, instead of the non-aqueous electrolyte and the separator, a solid electrolyte may be used.

Since the lithium-ion secondary battery of the present embodiment includes the cathode for a lithium-ion secondary battery of the present embodiment as the cathode, the lithium-ion secondary battery has a high energy density and has excellent input and output characteristics.

EXAMPLES

Hereinafter, the present invention will be more specifically described using examples and comparative examples, but the present invention is not limited to the following examples.

Example 1

Synthesis of Cathode Material for Lithium-Ion Secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 200° C. for four hours, thereby generating a precipitate.

Next, this precipitate was cleaned with water, thereby obtaining a cake-form precursor of a cathode active material.

Next, a polyethylene glycol (20 g) as the organic compound and zirconia balls having a diameter of 5 mm as medium particles were used in the precursor of the cathode active material (150 g in terms of solid contents), and a dispersion treatment was performed in a ball mill for two hours, thereby preparing a homogeneous slurry.

Next, this slurry was sprayed in the atmosphere at 200° C. and dried, thereby obtaining an agglomerate of the precursor of the cathode material which was coated with an organic substance having an average particle diameter of 8.5 μm.

Next, the obtained dried powder was calcinated in a nitrogen atmosphere for three hours at 700° C., thereby obtaining an agglomerate having an average particle diameter of 8.5 μm.

Cracking of Agglomerate

The above-described agglomerate was cracked using a jet mill device (manufactured by Nisshin Engineering Inc., trade name: SJ-100) so that the median diameter reached 0.74 μm, thereby obtaining a cathode material 1 of Example 1.

Production of Lithium-Ion Secondary Battery

The cathode material 1, polyvinylidene fluoride (PVdF) as a binding agent, and acetylene black (AB) as a conductive auxiliary agent were added to N-methyl-2-pyrrolidone (NMP) which is a solvent so that the mass ratio (the cathode material 1:AB:PVdF) in paste reached 94:1:5, and the components were mixed together and kneaded using a kneader (manufactured by Thinky Corporation, trade name: AWA-TORI RENTARO) for 30 minutes under conditions of a revolution rate of 1,200 rpm and a rotation rate of 800 rpm, thereby preparing cathode material paste (for the cathode).

This cathode material paste (for the cathode) was applied onto the surface of a 30 μm-thick aluminum foil (electrode current collector) so as to form a coated film, and the coated film was dried, thereby forming a cathode mixture layer on the surface of the aluminum foil.

After that, the cathode mixture layer was pressed at a pressure of 58.84 MPa, thereby producing a cathode 1 of Example 1.

A lithium metal was disposed as an anode with respect to this cathode 1, and a separator made of porous polypropylene was disposed between the cathode 1 and the anode, thereby producing a member for a battery 1.

Meanwhile, ethylene carbonate and diethyl carbonate were mixed together in a mass volume of 1:1, and furthermore, 1 M of a $LiPF_6$ solution was added thereto, thereby producing an electrolyte solution 1 having lithium ion conductivity.

Next, the member for a battery 1 was immersed in the electrolyte solution 1, there by producing a lithium-ion secondary battery 1 of Example 1.

Example 2

A cathode material 2 of Example 2 was obtained in the same manner as in Example 1 except for the fact that the cracking intensity of the jet mill device was set to 1.41 of the intensity in Example 1.

A lithium-ion secondary battery 2 of Example 2 was produced in the same manner as in Example 1 except for the fact that the cathode material 2 was used.

Example 3

A cathode material 3 of Example 3 was obtained in the same manner as in Example 1 except for the fact that the cracking intensity of the jet mill device was set to 2.50 of the intensity in Example 1.

A lithium-ion secondary battery 3 of Example 3 was produced in the same manner as in Example 1 except for the fact that the cathode material 3 was used.

Example 4

A cathode material 4 of Example 4 was obtained in the same manner as in Example 1 except for the fact that the cracking intensity of the jet mill device was set to 3.75 of the intensity in Example 1.

A lithium-ion secondary battery 4 of Example 4 was produced in the same manner as in Example 1 except for the fact that the cathode material 4 was used.

Example 5

A cathode material 5 of Example 5 was obtained in the same manner as in Example 1 except for the fact that the cracking intensity of the jet mill device was set to 4.50 of the intensity in Example 1.

A lithium-ion secondary battery 5 of Example 5 was produced in the same manner as in Example 1 except for the fact that the cathode material 5 was used.

Example 6

A cathode material 6 of Example 6 was obtained in the same manner as in Example 1 except for the fact that the cracking intensity of the jet mill device was set to 5.26 of the intensity in Example 1.

A lithium-ion secondary battery 6 of Example 6 was produced in the same manner as in Example 1 except for the fact that the cathode material 6 was used.

Example 7

Synthesis of cathode material for lithium-ion secondary battery Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 200° C. for 24 hours, thereby generating a precipitate.

Next, this precipitate was cleaned with water, thereby obtaining a cake-form precursor of a cathode active material.

Next, a polyethylene glycol (20 g) as the organic compound and zirconia balls having a diameter of 5 mm as medium particles were used in the precursor of the cathode active material (150 g in terms of solid contents), and a dispersion treatment was performed in a ball mill for two hours, thereby preparing a homogeneous slurry.

Next, this slurry was sprayed in the atmosphere at 200° C. and dried, thereby obtaining an agglomerate of the precursor of the cathode material which was coated with an organic substance having an average particle diameter of 8.3 µm.

Next, the obtained dried powder was calcinated in a nitrogen atmosphere for three hours at 700° C., thereby obtaining an agglomerate having an average particle diameter of 8.3 µm.

Cracking of Agglomerate

The above-described agglomerate was cracked using a jet mill device (manufactured by Nisshin Engineering Inc., trade name: SJ-100) so that the cracking intensity reached 4.50 of the cracking intensity in Example 1, thereby obtaining a cathode material 7 of Example 7.

A lithium-ion secondary battery 7 of Example 7 was produced in the same manner as in Example 1 except for the fact that the cathode material 7 was used.

Example 8

Synthesis of Cathode Material for Lithium-Ion Secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 160° C. for two hours, thereby generating a precipitate.

Next, this precipitate was cleaned with water, thereby obtaining a cake-form precursor of a cathode active material.

Next, a polyethylene glycol (20 g) as the organic compound and zirconia balls having a diameter of 5 mm as medium particles were used in the precursor of the cathode active material (150 g in terms of solid contents), and a dispersion treatment was performed in a ball mill for two hours, thereby preparing a homogeneous slurry.

Next, this slurry was sprayed in the atmosphere at 200° C. and dried, thereby obtaining an agglomerate of the precursor of the cathode material which was coated with an organic substance having an average particle diameter of 8.9 µm.

Next, the obtained dried powder was calcinated in a nitrogen atmosphere for three hours at 700° C., thereby obtaining an agglomerate having an average particle diameter of 8.9 µm.

Cracking of Agglomerate

The above-described agglomerate was cracked using a jet mill device (manufactured by Nisshin Engineering Inc., trade name: SJ-100) so that the cracking intensity reached 5.64 of the cracking intensity in Example 1, thereby obtaining a cathode material 8 of Example 8.

A lithium-ion secondary battery 8 of Example 8 was produced in the same manner as in Example 1 except for the fact that the cathode material 8 was used.

Example 9

Synthesis of Cathode Material for Lithium-Ion Secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 120° C. for five hours, thereby generating a precipitate.

Next, this precipitate was cleaned with water, thereby obtaining a cake-form precursor of a cathode active material.

Next, a polyethylene glycol (20 g) as the organic compound and zirconia balls having a diameter of 5 mm as medium particles were used in the precursor of the cathode active material (150 g in terms of solid contents), and a dispersion treatment was performed in a ball mill for two hours, thereby preparing a homogeneous slurry.

Next, this slurry was sprayed in the atmosphere at 200° C. and dried, thereby obtaining an agglomerate of the precursor of the cathode material which was coated with an organic substance having an average particle diameter of 9.1 µm.

Next, the obtained dried powder was calcinated in a nitrogen atmosphere for three hours at 700° C., thereby obtaining an agglomerate having an average particle diameter of 9.1 µm.

Cracking of Agglomerate

The above-described agglomerate was cracked using a jet mill device (manufactured by Nisshin Engineering Inc., trade name: SJ-100) so that the cracking intensity reached 6.00 of the cracking intensity in Example 1, thereby obtaining a cathode material 9 of Example 9.

A lithium-ion secondary battery 9 of Example 9 was produced in the same manner as in Example 1 except for the fact that the cathode material 9 was used.

Comparative Example 1

A cathode material 10 of Comparative Example 1 was obtained in the same manner as in Example 1 except for the fact that the cracking intensity of the jet mill device was set to 0.69 of the intensity in Example 1.

A lithium-ion secondary battery 10 of Comparative Example 1 was produced in the same manner as in Example 1 except for the fact that the cathode material 10 was used.

Comparative Example 2

A cathode material 11 of Comparative Example 2 was obtained in the same manner as in Example 1 except for the fact that the cracking intensity of the jet mill device was set to 0.90 of the intensity in Example 1.

A lithium-ion secondary battery 11 of Comparative Example 2 was produced in the same manner as in Example 1 except for the fact that the cathode material 11 was used.

Comparative Example 3

A cathode material 12 of Comparative Example 3 was obtained in the same manner as in Example 1 except for the fact that the cracking intensity of the jet mill device was set to 5.64 of the intensity in Example 1.

A lithium-ion secondary battery 12 of Comparative Example 3 was produced in the same manner as in Example 1 except for the fact that the cathode material 12 was used.

Comparative Example 4

A cathode material 13 of Comparative Example 4 was obtained in the same manner as in Example 1 except for the fact that the cracking intensity of the jet mill device was set to 6.43 of the intensity in Example 1.

A lithium-ion secondary battery 13 of Comparative Example 4 was produced in the same manner as in Example 1 except for the fact that the cathode material 13 was used.

Comparative Example 5

A cathode material 14 of Comparative Example 5 was obtained in the same manner as in Example 8 except for the fact that the cracking intensity of the jet mill device was set to 6.00 of the intensity in Example 1.

A lithium-ion secondary battery 14 of Comparative Example 5 was produced in the same manner as in Example 1 except for the fact that the cathode material 14 was used.

Comparative Example 6

A cathode material 15 of Comparative Example 6 was obtained in the same manner as in Example 1 except for the fact that the cracking intensity of the jet mill device was set to 6.43 of the intensity in Example 9.

A lithium-ion secondary battery 15 of Comparative Example 6 was produced in the same manner as in Example 1 except for the fact that the cathode material 15 was used.

Evaluation of Cathode Material for Lithium-Ion Secondary Battery and Lithium-Ion Secondary Battery The cathodes material for a lithium-ion secondary battery and the lithium-ion secondary batteries of Examples 1 to 9 and Comparative Examples 1 to 6 were evaluated as described below.

1. Specific Surface Area

The BET specific surface area of the cathode material for a lithium-ion secondary battery was measured using a measurement device (manufactured by Mountech Co., Ltd., trade name: HM model-1208) and a one-point method at a relative pressure of 0.29 ($P/P_0$).

2. Amount of Carbon

The amount of carbon in the cathode material for a lithium-ion secondary battery was measured using a carbon/sulfur analyzer (manufactured by Horiba Ltd., trade name: EMIA-220V).

3. Median Diameter

The median diameter in the cathode material for a lithium-ion secondary battery was measured using the following method.

The median diameter was measured using a measurement device (manufactured by Horiba Ltd., trade name: LA-950V2).

First, pure water (40 g) and polyvinylpyrrolidone (PVP) (0.12 g) as dispersion liquids and the cathode material for a lithium-ion secondary battery (0.04 g) as specimen powder were weighed in a 70 mL mayonnaise bottle. This mayonnaise bottle was manually shaken approximately ten times so as to mix the specimen powder and the dispersion liquids well.

Next, the mixed solution of the specimen powder and the dispersion liquids was treated with ultrasonic waves for two minutes under conditions of output 5 and pulse 50% in an ultrasonic homogenizer (manufactured by Branson Ultrasonics, Emersion Japan, Ltd., trade name: SONIFIER450), and the median diameter was measured using the obtained dispersion solution.

The median diameter was measured with the data loading number set to 5,000 in terms of LD and 1,000 in terms of LED, and the data computation conditions were as described below.

Computation Conditions
(Sample Refractive Index)
LD real part: 1.48
LD imaginary part: 0.45
LED real part: 1.50
LED imaginary part: 0.55
Dispersion Medium Refractive Index
LD real part: 1.33
LD imaginary part: 0.00
LED real part: 1.33
LED imaginary part: 0.00
(Number of repetitions): 15 times
(Particle diameter criterion): Volume
(Computation algorithm): Standard computation 4. Chromaticity b*

The chromaticity b* in the L*a*b* color space of the cathode material for a lithium-ion secondary battery was obtained by means of reflected light two-degree visual field measurement in which a spectroscopic calorimeter (Serial No.: SE-2000, manufactured by Nippon Denshoku Industries Co., Ltd.) and a D65 light source. When the chromaticity b* of the cathode material for a lithium-ion secondary battery was measured, the cathode material of the measurement subject was evenly placed on a scale, and the chromaticity b* of the cathode material was measured.

5. Cathode Density

The cathode density of the cathode material for a lithium-ion secondary battery was computed as a ratio of the mass of the cathode material as the numerator to the volume of the cathode which was the compressed cathode excluding the aluminum electrode current collector as the denominator.

In addition, in a case in which the cathode density was 2.00 g/cc or more, the cathode density was evaluated as A, in a case in which the cathode density was 1.90 g/cc or more, the cathode density was evaluated as B, and, in a case in which the cathode density was less than 1.90 g/cc, the cathode density was evaluated as C.

6. Capacity Retention after 20 Cycles

Regarding the capacity retention of the lithium-ion secondary battery after 20 cycles, when constant-current charging at a current value of 0.25 C until the battery voltage reached 3.7 V and then discharging at a current value of 0.5 C until the battery voltage reached 2.5 V in an environment of 45° C. was considered as one cycle, and this cycle was repeated 20 times, the fraction of the discharge capacity at the $20^{th}$ cycle as the numerator to the discharge capacity at the first cycle as the denominator was evaluated as the capacity retention. In a case in which the electron conductivity of the cathode material is not sufficiently guaranteed, active material particles repeatedly expand and shrink in accordance with the charge and discharge cycle, and thus the number of electron conduction paths in the cathode becomes insufficient, and thus the capacity retention decreases.

In addition, in a case in which the capacity retention after 20 cycles was 70% or more, the electron conductivity was evaluated as B, and, in a case in which the capacity retention after 20 cycles was less than 70%, the electron conductivity was evaluated as C.

Evaluation Results

The evaluation results of the cathode materials for a lithium-ion secondary battery and the lithium-ion secondary batteries of Examples 1 to 9 and Comparative Examples 1 to 6 are shown in Table 1. Meanwhile, the amount of carbon in Table 1 is the amount (parts by mass) of carbon that formed the carbonaceous film with respect to 100 parts by mass of the cathode active material.

TABLE 1

|  | Cracking intensity (relative ratio) | Specific surface area [m²/g] | Amount of carbon [parts by mass] | Chromaticity b* | Median diameter [μm] | Cathode density [g/cc] | Cathode density evaluation | Capacity retention after 20 cycles [%] | Electron conductivity evaluation |
|---|---|---|---|---|---|---|---|---|---|
| Example 1 | 1.00 | 8.4 | 1.05 | 1.90 | 0.78 | 1.92 | B | 74 | B |
| Example 2 | 1.41 | 8.4 | 1.05 | 1.96 | 0.73 | 1.93 | B | 75 | B |
| Example 3 | 2.50 | 8.5 | 1.05 | 2.00 | 0.70 | 1.98 | B | 75 | B |
| Example 4 | 3.75 | 8.5 | 1.05 | 2.13 | 0.65 | 1.97 | B | 75 | B |
| Example 5 | 4.50 | 8.6 | 1.05 | 2.24 | 0.60 | 1.99 | B | 73 | B |
| Example 6 | 5.26 | 8.7 | 1.05 | 2.28 | 0.56 | 2.02 | A | 74 | B |
| Example 7 | 4.50 | 5.6 | 0.68 | 2.27 | 0.52 | 2.04 | A | 78 | B |
| Example 8 | 5.64 | 15.3 | 1.85 | 2.28 | 0.61 | 1.97 | B | 73 | B |
| Example 9 | 6.00 | 24.6 | 2.90 | 2.29 | 0.69 | 1.93 | B | 72 | B |
| Comparative Example 1 | 0.69 | 8.3 | 1.05 | 1.85 | 0.84 | 1.79 | C | 76 | B |
| Comparative Example 2 | 0.90 | 8.3 | 1.05 | 1.87 | 0.81 | 1.87 | C | 74 | B |
| Comparative Example 3 | 5.64 | 8.9 | 1.05 | 2.33 | 0.54 | 2.03 | A | 62 | C |
| Comparative Example 4 | 6.43 | 9.2 | 1.05 | 2.41 | 0.48 | 2.05 | A | 51 | C |
| Comparative Example 5 | 6.00 | 15.3 | 1.85 | 2.32 | 0.57 | 2.03 | A | 60 | C |
| Comparative Example 6 | 6.43 | 24.6 | 2.90 | 2.34 | 0.61 | 2.01 | A | 59 | C |

When Examples 1 to 6 and Comparative Examples 1 to 4 are compared using the results of Table 1, in Comparative Examples 1 and 2 in which the chromaticity b* was 1.9 or less and the median diameter exceeded 0.80 μm, the cracking was not sufficient, and thus the cathode density was as low as 1.9 g/cc or less, and the energy density per unit volume was poor when used as a cathode material for a lithium-ion secondary battery.

In addition, in Comparative Example 4 in which the chromaticity b* was 2.3 or more and the median diameter was less than 0.50 μm, the cracking intensity was too high, and thus the carbonaceous film that coated the surfaces of the central particles was peeled off during the cracking, the capacity retention after 20 cycles was as lows as 70% or less, and the input and output characteristics and the durability were poor when used as a cathode material for a lithium-ion secondary battery.

On the other hand, in Examples 1 to 6 in which the median diameter was 0.50 μm or more and 0.80 μm or less and the chromaticity b* was 1.9 or more and 2.3 or less, excellent battery characteristics of the cathode density being 1.9 g/cc or more and the capacity retention after 20 cycles being 70% or more was exhibited, and it is possible to provide lithium-ion secondary batteries having excellent energy density, input and output characteristics, and durability when used as a cathode material for a lithium-ion secondary battery.

In addition, when Examples 6 to 9 and Comparative Examples 5 and 6 were compared, it is also possible to confirm that, even when the specific surface area and the amount of carbon vary, if the cracking intensity is adjusted so that the median diameter is 0.50 μm or more and 0.80 μm or less and the chromaticity b* is 1.9 or more and 2.3 or less, it is possible to develop excellent battery characteristics of the cathode density reaching 1.9 g/cc or more and the capacity retention after 20 cycles reaching 70% or more.

Lithium-ion secondary batteries for which the cathode material for a lithium-ion secondary battery of the present invention is used have excellent energy density, input and output characteristics, and durability and are thus capable of significantly contributing to the advancement of the reliability of lithium-ion secondary batteries commencing with mobile body applications.

What is claimed is:

1. A cathode material for a lithium-ion secondary battery which is active material particles including central particles represented by $Li_xA_yM_zPO_4$, wherein $0.95 \leq x \leq 1.1$, $0.8 \leq y \leq 1.1$, and $0 \leq z \leq 0.2$, A represents at least one element selected from the group consisting of Fe, Mn, and Ni, and M represents at least one element selected from the group consisting of Mg, Ca, Co, Sr, Ba, Ti, Zn, B, Al, Ga, In, Si, Ge, and rare earth elements, and a carbonaceous film that coats surfaces of the central particles,
   wherein the active material particles is a crushed powder obtained by crushing an aggregate of the active material particles by using a jet mill under a condition in which a supply rate of the aggregate into the jet mill is set to 50 g/hour to 1,500 g/hour, and an air pressure is set to 0.3 MPa to 0.7 MPa,
   a median diameter of the crushed powder particles is 0.52 μm or more and 0.78 μm or less,
   a chromaticity b* in an L*a*b* color space of the active material particles is 1.9 or more and 2.3 or less, and
   a thickness of the carbonaceous film is 0.2 nm or more and 10 nm or less,
   a coating ratio of the carbonaceous film with respect to the central particles is 60% or more and 95% or less,
   the average primary particle diameter of the primary particles of the central particles is 20 nm or more and 500 nm or less.

2. The cathode material for a lithium-ion secondary battery according to claim 1, wherein the central particles are $LiFePO_4$.

3. The cathode material for a lithium-ion secondary battery according to claim 1, wherein the median diameter is 0.55 μm or more and 0.75 μm or less, and the chromaticity b* is 1.95 or more and 2.3 or less.

4. The cathode material for a lithium-ion secondary battery according to claim 1, wherein a BET specific surface area is 5 m²/g or more and 25 m²/g or less, and an amount of carbon forming the carbonaceous film is 0.1 parts by mass or more and 10 parts by mass or less with respect to 100 parts by mass of the central particles.

5. A cathode for a lithium-ion secondary battery, comprising:
an electrode current collector; and
a cathode mixture layer formed on the electrode current collector,
wherein the cathode mixture layer includes the cathode material for a lithium-ion secondary battery according to claim 1.

6. A lithium-ion secondary battery comprising:
the cathode for a lithium-ion secondary battery according to claim 5.

7. The cathode material for a lithium-ion secondary battery according to claim 1, wherein the crushed powder is a secondary particle of the active material particles.

8. The cathode material for a lithium-ion secondary battery according to claim 1, wherein the median diameter of the crushed powder is measured by a laser diffraction,
the average primary particle diameter of the primary particles of the central particles is measured by a scanning electron microscope.

9. The cathode material for a lithium-ion secondary battery according to claim 1, wherein the amount of carbon forming the carbonaceous film is 0.1 parts by mass or more and 3 parts by mass or less with respect to 100 parts by mass of the central particles.

10. The cathode material for a lithium-ion secondary battery according to claim 1, wherein a carbon amount of the primary particles with respect to a specific surface area of the primary particles represented by [the carbon amount]/[the specific surface area of the primary particles of the central particles] is 0.01 g/m2 or more and 0.5 g/m2 or less.

11. The cathode material for a lithium-ion secondary battery according to claim 1, wherein the carbonaceous film is formed by carbonizing polyethylene glycol.

12. The cathode material for a lithium-ion secondary battery according to claim 1, wherein an amount of carbon forming the carbonaceous film is 0.1 to 2.90 parts by mass with respect to 100 parts by mass of the central particles.

13. The cathode material for a lithium-ion secondary battery according to claim 1, wherein an amount of carbon forming the carbonaceous film is 0.1 to 1.85 parts by mass with respect to 100 parts by mass of the central particles.

* * * * *